US012644431B2

(12) United States Patent
    Neibling

(10) Patent No.: US 12,644,431 B2
(45) Date of Patent: Jun. 2, 2026

(54) ROTOR CONFIGURATION

(71) Applicant: John Neibling, Sandy, UT (US)

(72) Inventor: John Neibling, Sandy, UT (US)

( * ) Notice: Subject to any disclaimer, the term of this patent is extended or adjusted under 35 U.S.C. 154(b) by 0 days.

(21) Appl. No.: 18/106,983

(22) Filed: Feb. 7, 2023

(65) Prior Publication Data

US 2024/0263612 A1 Aug. 8, 2024

(51) Int. Cl.
    *F03D 3/02* (2006.01)
(52) U.S. Cl.
    CPC ............ *F03D 3/02* (2013.01); *F05B 2240/37* (2020.08)
(58) Field of Classification Search
    CPC .................................... F03D 3/02; F03D 3/065
    See application file for complete search history.

(56) References Cited

U.S. PATENT DOCUMENTS

| | | | | |
|---|---|---|---|---|
| 3,942,909 A * | 3/1976 | Yengst | ...................... | F03D 7/06 |
| | | | | 416/139 |
| 7,220,107 B2 * | 5/2007 | Kaneda | .................... | F03D 3/062 |
| | | | | 416/186 A |
| 7,329,965 B2 * | 2/2008 | Roberts | .................... | F03D 13/20 |
| | | | | 290/55 |
| 7,896,608 B2 * | 3/2011 | Whitworth | ............ | F03D 3/0436 |
| | | | | 415/4.2 |
| 9,752,555 B2 * | 9/2017 | Gdovic | ...................... | F03D 3/02 |
| 10,612,515 B2 * | 4/2020 | Reyna | ........................ | F03D 3/02 |
| 11,236,724 B2 * | 2/2022 | Reyna | ..................... | F03D 15/00 |
| 2006/0275105 A1 * | 12/2006 | Roberts | ................... | F03D 3/061 |
| | | | | 415/4.2 |
| 2010/0092296 A1 * | 4/2010 | Ferenczy | ................ | F03D 3/061 |
| | | | | 416/197 A |
| 2013/0287570 A1 * | 10/2013 | Gdovic | ..................... | F03D 3/04 |
| | | | | 416/124 |
| 2016/0377053 A1 * | 12/2016 | Reyna | ..................... | F03D 3/005 |
| | | | | 415/210.1 |
| 2020/0300217 A1 * | 9/2020 | Reyna | ..................... | F03D 15/00 |
| 2024/0209831 A1 * | 6/2024 | Opitz | ...................... | F03D 3/005 |

* cited by examiner

*Primary Examiner* — Eldon T Brockman
(74) *Attorney, Agent, or Firm* — DUREN IP; Todd E. Zenger

(57) ABSTRACT

The present technology is directed to the design and relative placement of a plurality of rotor vanes against which a directional fluid flows thereby exerting a force against the vanes and rotating the vanes in a desired direction. The plurality of vanes is disposed about a central axis such that when the fluid exerts its force against the vanes the vanes rotate continuously about the central axis.

7 Claims, 4 Drawing Sheets

ROTOR CONFIGURATION

BACKGROUND OF THE INVENTION

1. Field of the Invention

The present technology relates to apparatuses, methods of use and systems for a contour surface configuration such as a rotor. The contour surface and arrangement of a plurality of contour surfaces captures and/or directs fluid flow, be the fluid flow directed or ambient air or water flow. The configuration of the contour surface and the arrangement of a plurality of the contour surfaces can be used for power generation or for generation of other useful mechanical force.

The present technology may be embodied in an improved rotor configuration for use in fluid flows to convert fluid flow to mechanical power. The present technology relates to the design and relative placement of a plurality of rotor vanes against which a directional fluid flows thereby exerting a force against the vanes and rotating the vanes in a desired direction. More particularly, the plurality of vanes is disposed about a central axis such that when the fluid exerts its force against the vanes the vanes rotate continuously about the central axis.

2. Background and Related Art

There are a number of rotor configurations used to drive turbines. The configurations of the disclosed technology are suited for wind turbine application. Known wind turbine configurations include Horizontal Axis Wind Turbine (HAWT) and Vertical Axis Wind Turbine (VAWT). In HAWT the axis of rotation is parallel to level ground. In VAWT the axis of rotation is substantially normal or perpendicular to level ground.

The technology of the disclosed technology has particular application to VAWT. VAWT has the advantages of being operable in wind flows coming from any direction, and of typically having a smaller footprint than traditional HAWTs. VAWTs function in locations with relatively low wind strength or with constant winds. One VAWT configuration is known as a savonius turbine.

Savonius turbines are relatively simple turbines. Aerodynamically, they are drag-type devices. They may comprise two or three curved, vertically-standing blades. A typical two-blade savonius wind turbine would appear in a top view to look like a "S" letter shape with the two blades joining at the axis of rotation. The savonius wind turbine rotates due to the difference in forces exerted on each blade. Wind exerts a force against the concave blade and convex blade concurrently. Due to the nature of the concave and convex surfaces, a greater drag force, F-Concave, is exerted against the concave surface than the drag force exerted against the convex surface, F-Convex. That is, F-Concave>F-Convex. This pressure differential causes the rotor configuration to rotate about its vertical axis to provide a source of mechanical power. Similarly, three-blade savonius wind turbines may be similarly constructed and operate under the same principles.

A modified three-blade savonius-type VAWT configuration is shown in U.S. Pat. No. 4,177,009. The configuration employs two V-shaped blades. Each V-shaped blade comprises two curved plate members shaped from sections of a cylinder. The two sections meet at a point or vertex. Each blade is fixed between a top and bottom quasi-rectangular end plate. One section of each blade is fixed along the outer edge of top and bottom plates concentric about the axis of the shaft and the other section extends inward toward the shaft. The two, fixed, V-shaped blades do not meet each other at the shaft or axis of the turbine but are spaced apart. A smaller, third, s-shaped blade fixed about the shaft of the turbine relative to the other two other blades and occupies the center of the turbine between the two other blades. The third, centered, s-shaped blade does not connect to the other two blades.

Accordingly, it would be an improvement in the art to provide apparatuses, methods and systems which provide improved, simplified structure and increased efficiency of savonius-type turbines.

SUMMARY OF THE INVENTION

Unlike the prior art, the present technology to apparatuses, methods and systems configured using a tri-vane configuration whose vanes comprise a novel shape and whose relative placement relative to each other improves rotational torque upon the turbine at lower flow rates of the driving fluid by more efficiently directing fluid flow and reducing drag as the fluid acts against the tri-vane configuration.

The present technology comprises three similar-shaped rotor vanes. Each vane comprises a single-member, continuous curved shape. The curve may comprise an arc such as an ellipse or some section of less than half of a cylinder. The arc of each vane may be substantially similar.

Each vane is fixed between a first and second flange. Each vane is fixed between flanges such that a first or outward end of the vane is disposed near the circumferential edge of the flanges, each first end being spaced uniformly about the circumferential edge of the flanges. The second or inward end of each vane is disposed inward of the circumferential edge of the flanges terminating at a location laterally beyond the axis between the axis of the turbine and the opposing circumferential edge of the flanges.

The placement of the vanes is such that no vane touches another vane. The placement of the vanes is such that no vane is disposed over the axis of the turbine. That is, the placement of the inward end of each vane is spaced a distance away from the axis of the turbine defining an open well extending from the axis of the turbine radially outward. In side-view, there is no pathway through which air may pass through the turbine without acting directly against at least two vanes.

In this way, unlike the known savonius blade configurations the disclosed technology of the present invention provides increased rotational torque about the axis of the turbine at lower flow rates of the driving fluid by more efficiently directing the fluid flow through the novel vane configuration, multiplying initial torque, and by reducing counter drag against the returning vane(s) moving against the fluid flow.

These and other features and advantages of the present invention will be set forth or will become more fully apparent in the description that follows and in the appended claims. The features and advantages may be realized and obtained by the disclosed structure, methods and systems and particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to apparatuses, methods and systems for an improved rotor configuration for use in fluid flows to convert fluid flow to mechanical power. The present technology relates to the design and relative placement of a plurality of rotor vanes against which a directional fluid flows thereby exerting a force against the vanes and rotating the vanes in a desired direction. More particularly, the plurality of vanes is disposed about a central axis such that when the fluid exerts its force against the vanes the vanes rotate continuously about the central axis. The present invention simplifies the structure and function of the rotor vane configuration resulting in greater efficiency of rotation of the rotor configuration and in rotation at lower flow rates of the fluid.

Figure 1:
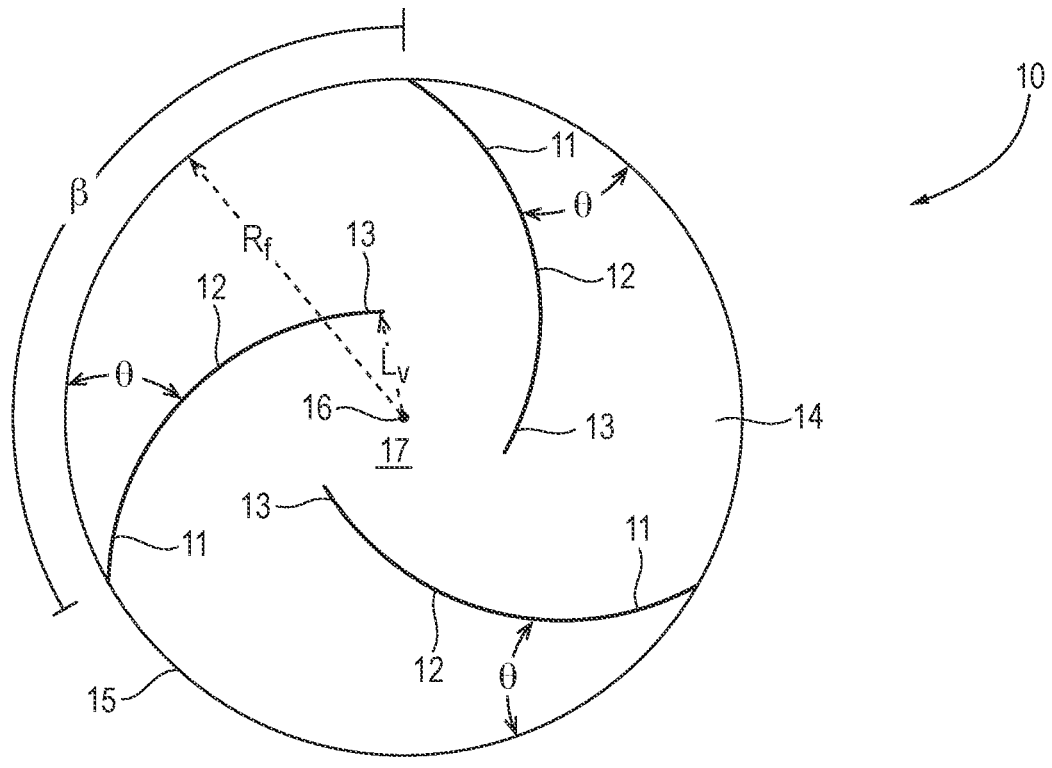
FIG. 1 illustrates a plan view of one embodiment of the tri-vane configuration of the disclosed technology upon a flange.
Figure 2:
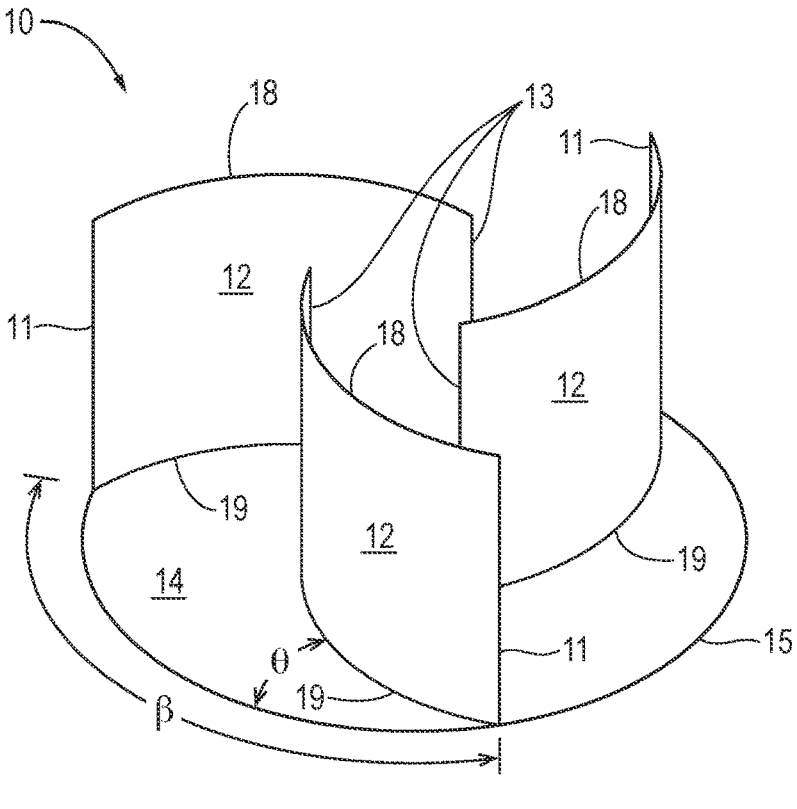
FIG. 2 illustrates a perspective view of one embodiment of the tri-vane configuration of the disclosed technology upon a flange shown in FIG. 1.
Figure 3:
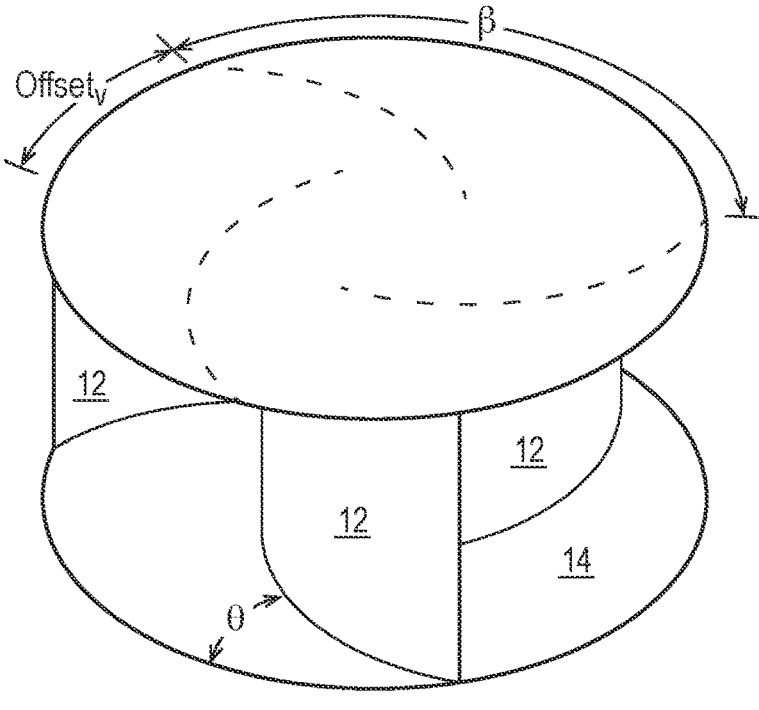
FIG. 3 illustrates a perspective view of one embodiment of the tri-vane configuration of the disclosed technology disposed between two flanges with the 40° displacement of an adjacent tri-vane configuration.

As depicted FIGS. 1-3, a novel three- or tri-vane rotor configuration 10 is depicted. In one embodiment each vane 12 comprises an arc-shaped curve. The shape of the arc may comprise an ellipse, may comprise a portion of the circumference of a circle, or may comprise a combination of an ellipse and a portion of a circumference of a circle. The arced shape of vane 12 defines a concave side and convex side of each vane 12.

Each vane comprises a vane top 18 and a vane bottom 19. Each vane 12 comprises a first or outward end 11 and a second or inward end 13. Each vane 12 is affixed to a support flange 14. In one embodiment vane 12 may terminate near or at circumferential edge 15 without extending along a length of circumferential edge 15. Each vane comprising a height Hv, from about 800 mm to about 1000 mm, preferable about 900 mm. Each vane 12 having a thickness from about 2 mm to about 4 mm, preferably about 3 mm. Vane 12 may be constructed of aluminum, steel, or composite material, or any other material suitable for the environment which does not degrade so as compromise the operation or efficiency of the rotor configuration. Aluminum is favorable because it is lighter, requires smaller thrust bearing, does not rust and allows the rotor configuration to more quickly responds to the magnitude of pulses or gusts and/or directional flow of the fluid/air. Composites materials may be less desirable due to potential limitations related to ultraviolet degradation.

The support flange 14 may comprise a flat or substantially flat surface. As shown in FIG. 1, support flange 14 is circular. Support flange 14 may be any geometric shape sufficient to support an adjacent tri-vane configuration. Support flange 14 comprises a circumferential edge 15 at its boundary and a center 16. Flange 14 comprises a center 16. Flange 14 has a flange radius $R_f$ from center 16 to circumferential edge 15, shown by dotted line $R_f$. Center 16 corresponds with the axis of a power shaft connected to a flange 14, not shown. Flange 14 having a thickness from about 2 mm to about 4 mm, preferably about 3 mm. Flange 14 may be constructed of aluminum, steel or composite, or any other material suitable for the environment which does not degrade so as compromise the operation or efficiency of the rotor configuration Composites materials may be less desirable due to potential limitations related to ultraviolet degradation. $R_f$ may be from about 0.3 m and larger, preferably about 1 m.

Each blade 12 is attached to two support flanges 14, one support flange connected to the vane tops 18 and another flange attached to the vane bottoms 19, see FIGS. 3-5A. Each curved vane is attached to the flange an angle θ between vane 12 and circumferential edge 15. Angle Θ may vary from about 0° to about 90°. In the preferred embodiment angle Θ is from about 30° to about 40°.

The outward end 11 of each vane 12 is disposed near or at circumferential edge 15 at an angle β relative to center 16 and the other outward ends 11. In a preferred embodiment angle β is 120° about center 16. Vanes 12 may be disposed upon flanges 14 by fixing vanes 12 to flange 14 by welding or spot welding, gluing, or mechanically fastening via rivets, screws, bolts, or otherwise.

The inward end 13 of each vane 12 terminates about center 16. Terminating ends of ends 13 are spaced laterally from each other and from center 16. The terminating ends of ends 13 are disposed a terminating length $L_v$ from center 16, shown as dotted line $L_v$. Each vane 12 may extend laterally inward a distance such that the terminating end of end 13 is beyond center 16 relative to a line normal from a line between center 16 and the location at which end 11 is disposed on circumferential edge 15. In any event, the terminating ends of ends 13 extend a sufficient distance inward to preclude air or fluid from passing directly through rotor configuration 10 without contacting a vane 12. In the preferred embodiment, the terminating end of each end 13 extends laterally inward a distance such that the terminating end of end 13 is beyond center 16 relative to a line normal from a line between center 16 and the location at which end 11 is disposed on circumferential edge 15 and extends a sufficient distance inward to preclude air or fluid from passing directly through rotor configuration 10 without contacting a vane 12.

In one embodiment of novel rotor configuration 10, no vane 12 or any other vane, structure or other physical obstruction which occupies center 16 or which is disposed within an area about center 16 defined by a radius of at least length $L_v$. In this way, the terminating ends of ends 13 may define an open, unobstructed well 17 about center 16 extending outward from center 16 a well distance $D_w$ where $D_w$ is equal to or greater than $L_v$ and is equal to or less than $R_f$, $L_v \leq D_w \leq R_f$. Open well 17 permits a directional flow of fluid contacting a concave side of vane 12 to be compressed near and/or deflect off the concave side of vane 12 and pass without any structural obstruction directly across open well 17 to the concave side of each adjacent vane 12.

Consistent with the underlying principles of directional fluid flow over savonius rotor configurations having curved-shapes blades or vanes, the force acting against the concave side of vane 12, F-Concave, is greater than the force acting against the convex side of vane 12, F-Convex, F-Concave>F-Convex. Unlike the prior art, open well 17 provides improved, additional F-Concave against the concave side of each adjacent vane 12 subject to a F-Convex to additionally counteract F-Convex acting against any adjacent vane(s).

Described another way, the centerpoint of a concave side of a first vane experiencing initial F-Convex from a directional flow may be positioned across open well 17 from the centerpoint of the concave side of an adjacent second vane such that directional fluid/air flow deflecting off the concave side of the first vane is split directing a portion of the fluid/air flow against or near the centerpoint of the concave side of an adjacent second vane where the fluid/air flow is again split and directed against or near the centerpoint of the concave side of the third vane, and so on. This novel blade configuration 10 with open well 17 causes a multiplication of initial torque by increasing the amount of kinetic energy that can be captured by a given volume of fluid/air flow.

Figure 4:
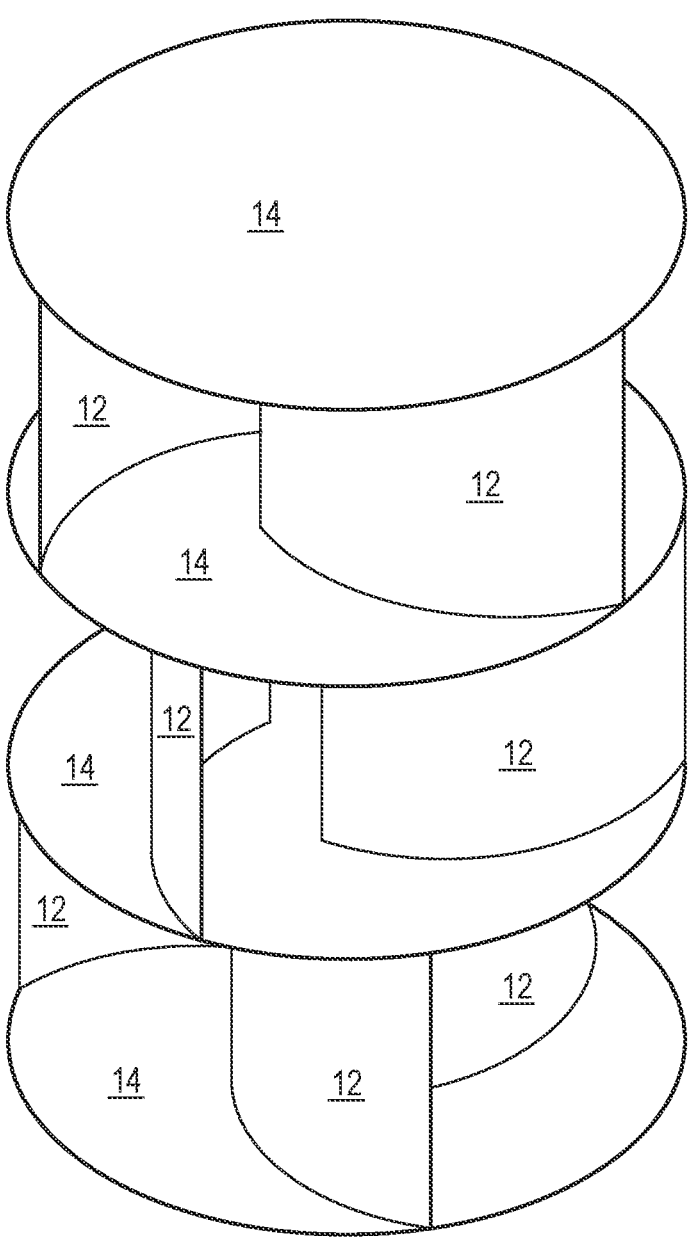
FIG. 4 illustrates a perspective view of one embodiment of a three, stacked tri-vane rotor assembly of the disclosed technology disposed between flanges with the 40° displacement of adjacent tri-vane rotor configurations.
Figure 5A:
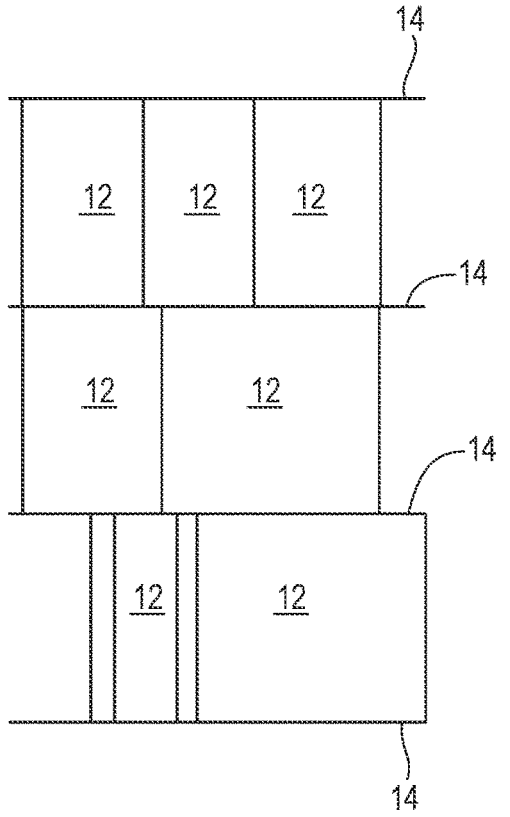
FIG. 5A illustrates a side-view of the stacked rotor assembly of FIG. 4 at an exemplary phase of rotation of the stacked rotor assembly.
Figure 5B:
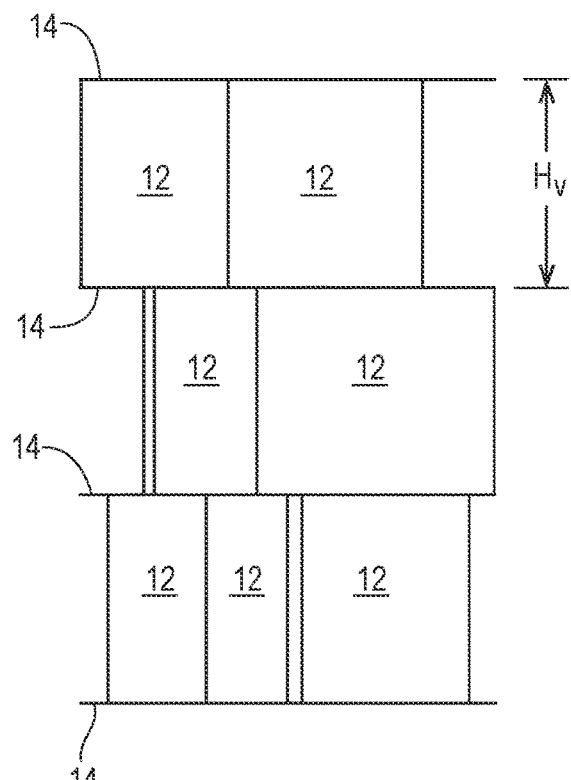
FIG. 5B illustrates a side-view of the stacked rotor assembly of FIG. 4 at another exemplary phase of rotation of the stacked rotor assembly.

As depicted in FIGS. 4-5B, a rotor device may comprise stacked units or cells be stacked units or cells of novel rotor configuration 10 to form a multiple rotor assembly. In this way some vane configurations may share a common flange 14. Each center 16 of each stacked rotor configuration 10 shares a common axis which also corresponds with the axis of a power shaft, not shown.

Also depicted in FIGS. 3-5B is an offset of adjacent vane configurations between stacked rotor configurations, Offset$_v$. For a three-stack configuration, one embodiment of Offset$_v$ is 40° relative to center 16, that is, one-third of the ß or 120° displacement of ends 11. For a four-stack configuration, one embodiment of Offset$_v$ is 30° relative to center 16, that is, one-fourth of the B or 120° displacement of ends 11, and so on. Other non-uniform spacings of Offset may be employed. However, uniform spacing of Offset$_v$ has proven most efficient for maintaining smooth rotations of a stacked assembly by advancing each unit or cell to a different phase in rotation. For example, by utilizing a three-vane configuration, the peak torque is inhibited by only a partial length of a returning convex vane, thereby minimizing the counter rotational forces induced by a returning vane. An odd-numbered vane configuration is superior to an even or symmetrical number of vanes because symmetrical number of vanes present a full length of a returning convex vane opposite a full-length concave vane whereby the symmetrical number configuration results in a large counter-rotational force or moment acting against the directional fluid flow or peak input.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claimed inventions are to be embraced within their scope.

What is claimed is:

1. A rotor configuration comprising:
a first substantially flat support flange;
a second substantially flat support flange;
each flange bounded by a circumferential edge and having a center;
three vertical vanes, each vane comprising a height with a top and a bottom, a curved construction, a first end and a second end, the vane tops attached to the first flange, vane bottoms attached to the second flange; the first vane end terminating laterally at or near the circumferential edge of the flange, and the second vane end terminating laterally inwardly of the circumferential edge a distance away from the center of the flange, wherein the terminating second end of the vane is located adjacent the centerpoint of the concave side of an adjacent vane such that a portion of directional fluid/air flow acting against the concave side of the vane is directed against or near the centerpoint of the concave side of an adjacent vane;
the first ends of the vanes displaced about one hundred and twenty degrees from each other relative to the center of the flange; and
an open well defined by the vanes and located about the center of the flange to provide an unobstructed passageway of fluid/air flowing from the concave side of a vane across the open well to the concave side of an adjacent vane.

2. The apparatus of claim 1 wherein each curved vane defines a concave and convex surface, with each concave surface of each vane facing a convex surface of an adjacent vane.

3. The apparatus of claim 1 wherein the open well is free of any physical structure or obstruction between the flanges.

4. A stacked rotor assembly comprising:
a plurality of rotor configurations in a stacked arrangement, each rotor configuration comprising:
one or more substantially flat support flanges, each flange bounded by a circumferential edge and having a center;
three vertical vanes, each vane comprising a height with a top and a bottom, a curved construction, a first end and a second end, the vanes attached to one or more flanges, the first vane end terminating laterally at or near the circumferential edge of a flange, and the second vane end terminating laterally inwardly of the circumferential edge a distance away from the center of a flange, wherein the terminating second end of the vane is located adjacent the centerpoint of the concave side of an adjacent vane such that a portion of directional fluid/air flow acting against the concave side of the vane is directed against or near the centerpoint of the concave side of an adjacent vane;
the first ends of the vanes displaced about one hundred and twenty degrees from each other relative to the center of a flange; and
an open well defined by the vanes and located about the center of the flanges to provide an unobstructed passageway of fluid/air flowing from the concave side of a vane across the open well to the concave side of an adjacent vane.

5. The apparatus of claim 4 wherein each curved vane defines a concave and convex surface, with each concave surface of each vane facing a convex surface of an adjacent vane.

6. The apparatus of claim 4 wherein the open well is free of any physical structure or obstruction between the flanges.

7. The apparatus of claim 4 wherein the flanges from one rotor configuration to an adjacent rotor configuration are displaced circumferentially such that the vanes from one rotor configuration do not overlie the vanes of the adjacent rotor configuration such that each rotor configuration is presented at a different angular rotation in the stack.

\* \* \* \* \*

5